(12) United States Patent
Sung (10) Patent No.: US 11,181,028 B2
(45) Date of Patent: Nov. 23, 2021

(54) AMMONIA GENERATION SYSTEM FOR NOX EMISSION CONTROL

(71) Applicant: BASF CORPORATION, Florham Park, NJ (US)

(72) Inventor: Shiang Sung, New York, NY (US)

(73) Assignee: BASF Corporation, Florham Park, NJ (US)

( * ) Notice: Subject to any disclaimer, the term of this patent is extended or adjusted under 35 U.S.C. 154(b) by 104 days.

(21) Appl. No.: 16/500,270

(22) PCT Filed: Apr. 3, 2018

(86) PCT No.: PCT/IB2018/052290
§ 371 (c)(1),
(2) Date: Oct. 2, 2019

(87) PCT Pub. No.: WO2018/185655
PCT Pub. Date: Oct. 11, 2018

(65) Prior Publication Data
US 2021/0131326 A1    May 6, 2021

Related U.S. Application Data

(60) Provisional application No. 62/481,327, filed on Apr. 4, 2017.

(51) Int. Cl.
*F01N 3/20* (2006.01)
*F01N 13/00* (2010.01)
*F01N 9/00* (2006.01)

(52) U.S. Cl.
CPC ............... *F01N 3/208* (2013.01); *F01N 9/00* (2013.01); *F01N 13/009* (2014.06);
(Continued)

(58) Field of Classification Search
CPC combination set(s) only.
See application file for complete search history.

(56) References Cited

U.S. PATENT DOCUMENTS

| 3,030,181 A | 4/1962 | Milton |
| 4,440,871 A | 4/1984 | Lok et al. |

(Continued)

FOREIGN PATENT DOCUMENTS

| DE | 4103668 | 8/1992 |
| EP | 0640378 | 3/1995 |

(Continued)

OTHER PUBLICATIONS

"Ammonia for fuel update," New Energy and Fuel, Blog entry published Oct. 18, 2011; available online at https://newenergyandfuel.com/http:/newenergyandfuel/com/2011/10/18/ammonia-for-fuel.
(Continued)

*Primary Examiner* — Binh Q Tran
(74) *Attorney, Agent, or Firm* — Finnegan, Henderson, Farabow, Garrett & Dunner LLP (57) ABSTRACT

The invention provides an emission control system for treatment of an exhaust gas stream of an engine, including an engine producing an exhaust gas stream; an SCR catalyst unit downstream from the engine and in fluid communication with the exhaust gas stream; and an ammonia generation system comprising a reservoir containing ammonium hydroxide and an ammonia injector, wherein the reservoir is in fluid communication with the ammonia injector and the ammonia injector is in fluid communication with the exhaust gas stream upstream of the SCR catalyst unit. A method of treating an exhaust gas stream of an engine is also provided, including the steps of heating ammonium hydroxide to produce gaseous ammonia and transferring the gaseous ammonia through an ammonia injector into the exhaust gas (Continued)

stream such that the gaseous ammonia disperses within the exhaust gas stream upstream of a SCR catalyst unit.

16 Claims, 4 Drawing Sheets

(52) U.S. Cl.
CPC ...... *F01N 2240/25* (2013.01); *F01N 2250/02* (2013.01); *F01N 2370/04* (2013.01); *F01N 2610/02* (2013.01)

(56) References Cited

U.S. PATENT DOCUMENTS

| | | | |
|---|---|---|---|
| 4,544,538 | A | 10/1985 | Zones |
| 5,407,761 | A | 4/1995 | Ovshinsky et al. |
| 6,162,415 | A | 12/2000 | Liu et al. |
| 6,171,556 | B1 | 1/2001 | Burk et al. |
| 6,193,929 | B1 | 2/2001 | Ovshinsky et al. |
| 6,709,644 | B2 | 3/2004 | Zones et al. |
| 7,229,597 | B2 | 6/2007 | Patchett et al. |
| 7,264,789 | B1 | 9/2007 | Verduijn et al. |
| 7,704,475 | B2 | 4/2010 | Bull et al. |
| 7,998,423 | B2 | 8/2011 | Boorse et al. |
| 8,404,203 | B2 | 3/2013 | Bull et al. |
| 8,475,722 | B2 | 7/2013 | Nakanishi et al. |
| 9,011,807 | B2 | 4/2015 | Mohanan et al. |
| 9,017,626 | B2 | 4/2015 | Tang et al. |
| 9,242,238 | B2 | 1/2016 | Mohanan et al. |
| 9,321,042 | B2 | 4/2016 | Hoke et al. |
| 9,352,307 | B2 | 5/2016 | Stiebels et al. |
| 9,517,456 | B2 | 12/2016 | Patchett et al. |
| 9,702,291 | B2 * | 7/2017 | Ettireddy ............... F01N 13/009 |
| 9,757,717 | B2 | 9/2017 | Patchett et al. |
| 10,640,358 | B2 * | 5/2020 | Zitkovic, Jr. ......... B67D 7/0288 |
| 2001/0049339 | A1 | 12/2001 | Schafer-Sindlinger et al. |
| 2002/0002905 | A1 | 1/2002 | Umino et al. |
| 2002/0166546 | A1 | 11/2002 | Andrews et al. |
| 2004/0241507 | A1 | 4/2004 | Schubert et al. |
| 2007/0246351 | A1 | 10/2007 | Smola et al. |
| 2007/0274892 | A1 | 11/2007 | Duvinage et al. |
| 2008/0003470 | A1 | 1/2008 | Christenson et al. |
| 2008/0196588 | A1 | 8/2008 | Gretta et al. |
| 2008/0257751 | A1 | 10/2008 | Smola et al. |
| 2008/0274873 | A1 | 11/2008 | Schubert |
| 2009/0107116 | A1 | 4/2009 | Barber et al. |
| 2009/0263296 | A1 | 10/2009 | Taques |
| 2009/0285740 | A1 | 11/2009 | Sobolevskiy et al. |
| 2010/0024403 | A1 | 2/2010 | Johannessen et al. |
| 2010/0024542 | A1 | 2/2010 | Yen et al. |
| 2010/0107615 | A1 * | 5/2010 | Chmielewski ............ F01N 3/00 60/303 |
| 2010/0186375 | A1 | 7/2010 | Kazi et al. |
| 2010/0251700 | A1 | 10/2010 | Wan et al. |
| 2011/0008694 | A1 | 1/2011 | Tange et al. |
| 2011/0236790 | A1 | 9/2011 | Schubert |
| 2011/0280768 | A1 * | 11/2011 | Kawasaki ............... F01N 3/208 422/111 |
| 2013/0047584 | A1 | 2/2013 | Park |
| 2014/0363358 | A1 | 12/2014 | Udd et al. |
| 2016/0101412 | A1 * | 4/2016 | Bull .................... B01J 29/068 502/60 |
| 2016/0136626 | A1 | 5/2016 | Phillips et al. |
| 2016/0138452 | A1 * | 5/2016 | Dingle ................. F01N 3/0814 60/274 |
| 2016/0153335 | A1 * | 6/2016 | Itoh ..................... B01D 53/9431 422/109 |
| 2016/0230255 | A1 | 8/2016 | Young et al. |
| 2016/0281566 | A1 * | 9/2016 | Deshpande ........... F01N 3/2066 |
| 2016/0298514 | A1 | 10/2016 | Raux |
| 2016/0310897 | A1 | 10/2016 | Tsuji et al. |
| 2016/0340182 | A1 | 11/2016 | Hosono et al. |
| 2016/0348556 | A1 | 12/2016 | Suyama |
| 2018/0258812 | A1 * | 9/2018 | De Cesare ............. F01N 3/206 |

FOREIGN PATENT DOCUMENTS

| | | |
|---|---|---|
| EP | 2230001 | 9/2010 |
| FR | 2941499 | 7/2011 |
| GB | 868846 | 5/1961 |
| JP | H06146873 | 5/1994 |
| JP | 2006136776 | 6/2006 |
| JP | 2010203335 | 6/2006 |
| JP | 2010203335 | 9/2010 |
| KR | 970070445 | 11/1997 |
| KR | 20050115420 | 12/2005 |
| KR | 20100098143 | 9/2010 |
| KR | 101076841 | 10/2011 |
| KR | 101553587 | 9/2015 |
| WO | WO2014073576 | 5/2014 |
| WO | WO2015145181 | 10/2015 |
| WO | WO2016034401 | 3/2016 |
| WO | WO2016070090 | 5/2016 |
| WO | WO2016138418 | 9/2016 |
| WO | WO2017019958 | 2/2017 |
| WO | WO2018185661 | 10/2018 |

OTHER PUBLICATIONS

"Why on-board hydrogen generators won't boost your mileage," Blog entry published Aug. 4, 2008; available at https://www.autoblog.com/2008/08/04/why-on-board-hydrogen-generators-wont-boost-your-mileage/.
Kim et al."Development on New Catalyst Technology for Compact SCR Modularization for Ship", The Korean Society of Industrial and Engineering Chemistry 2016 Spring Meeting.
Alfred K. Hill, Laura Torrente-Murciano; "Low temperature $H_2$ production from ammonia using ruthenium-based catalysts: Synergetic effect of promoter and support," Applied Catalysis B: Environmental 172-173 (2015) 129-135.
N. Itoh, A. Oshima, E. Suga, T. Sato;"Kinetic enhancement of ammonia decomposition as a chemical hydrogen carrier in palladium membrane reactor," Catalysis Today 236 (2014) 70-76.
William I. F. David, Joshua W. Makepeace, Samantha K. Callear, Hazel M. A. Hunter, James D. Taylor, Thomas J. Wood, Martin O. Jones, J, "Hydrogen production from ammonia using sodium amide,". Am. Chem. Soc. 2014, 136 (38).
Irena Short, Ashok Sahgal, Walter Hayduk, "Solubility of ammonia and hydrogen sulfide in several polar solvents,", J. Chem. Eng. Data 1983, v28(1), 63-66.
"Ammonia for fuel update," New Energy and Fuel, Blog entry published Oct. 18, 2011; available online at https://newenergyandfuel.com/http:/newenergyandfuel/com/2011/10/18/ammonia.

\* cited by examiner

AMMONIA GENERATION SYSTEM FOR NOX EMISSION CONTROL

CROSS-REFERENCE TO RELATED APPLICATIONS

This application is a 35 U.S.C. § 371 application of International Application No. PCT/US2018/052290, filed Apr. 3, 2018, which International Application was published by the International Bureau in English on Oct. 11, 2018, and claims priority to U.S. Provisional Application No. 62/481,327, filed Apr. 4, 2017, which are incorporated herein by reference in their entirety and for all purposes.

FIELD OF THE INVENTION

The present invention relates generally to the field of selective catalytic reduction catalysts and to emission control systems employing such catalysts.

BACKGROUND OF THE INVENTION $NO_x$ is contained in exhaust gases, such as from internal combustion engines (e.g., in automobiles and trucks), from combustion installations (e.g., power stations heated by natural gas, oil, or coal), and from nitric acid production plants. Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as an SCR (Selective Catalytic Reduction) process. The SCR process uses catalytic reduction of nitrogen oxides with a reductant (e.g., ammonia) in the presence of atmospheric oxygen, resulting in the formation predominantly of nitrogen and steam:

$$4NO + 4NH_3 + O_2 \rightarrow 4N_2 + 6H_2O \quad \text{(standard SCR reaction)}$$

$$2NO_2 + 4NH_3 \rightarrow 3N_2 + 6H_2O \quad \text{(slow SCR reaction)}$$

$$NO + NO_2 + NH_3 \rightarrow 2N_2 + 3H_2O \quad \text{(fast SCR reaction)}$$

Current catalysts employed in the SCR process include molecular sieves, such as zeolites, ion-exchanged with a catalytic metal such as iron or copper. Conventional SCR catalyst emission control systems used for diesel engines provide ammonia necessary for the above-noted SCR reactions by injecting diesel exhaust fluid, a mixture of urea and water, into the exhaust stream upstream of the SCR catalyst. The urea decomposes in the exhaust stream to produce ammonia and carbon dioxide. However, urea decomposition requires temperatures of about 180° C. or higher, and diesel exhaust fluid systems also typically require a relatively long channel for optimal mixing and/or a high turbulence mixing area prior to entry into the SCR catalyst unit. Still further, urea deposits can occur in such systems, particularly during low temperature operation. Accordingly, use of diesel exhaust fluid as the ammonia source presents challenges and increases system complexity, particularly in cold environments where heating of the diesel exhaust fluid is required.

There remains a need in the art for improved systems for delivering the necessary reductant for SCR catalyst function in emission control systems.

SUMMARY OF THE INVENTION

The present invention provides an emission control system and related method for treatment of an exhaust gas stream that includes use of an ammonia generation system adapted to provide ammonia for injection into the exhaust gas stream as a reductant for a downstream SCR catalyst, wherein the ammonia generation system utilizes ammonium hydroxide as the source of ammonia. Use of ammonium hydroxide offers numerous advantages over conventional diesel exhaust fluid systems, including improved low temperature performance.

In one aspect, the invention provides an emission control system for treatment of an exhaust gas stream, comprising an engine or other exhaust gas source (e.g., a diesel engine or other lean burn engine) producing an exhaust gas stream; an SCR catalyst unit downstream from the engine and in fluid communication with the exhaust gas stream; and an ammonia generation system adapted to provide ammonia for injection into the exhaust gas stream and comprising a reservoir containing ammonium hydroxide and an ammonia injector, wherein the reservoir is in fluid communication with the ammonia injector and the ammonia injector is in fluid communication with the exhaust gas stream upstream of the SCR catalyst unit.

In certain embodiments, the reservoir is a refillable reservoir having a refilling port and/or the reservoir is in fluid communication with a windshield fluid tank such that a solution of ammonium hydroxide reduced in ammonia concentration can be purged from the reservoir. The ammonia generation system may further include a gaseous ammonia storage tank, a conduit connecting the gaseous ammonia storage tank and the reservoir, and a heater positioned to heat ammonia hydroxide within either the reservoir or the conduit in order to produce gaseous ammonia, wherein the gaseous ammonia storage tank is in fluid communication with the ammonia injector. Still further, the emission control system can include one or more controllers adapted to monitor and control heating of the ammonium hydroxide to produce gaseous ammonia and to monitor and control the amount of ammonia injected into the exhaust gas stream by the ammonia injector.

The SCR catalyst utilized in the SCR catalyst unit can vary and may include a metal ion-exchanged molecular sieve or a mixed oxide catalyst. In certain embodiments, the SCR catalyst is a metal ion-exchanged zeolite having a silica-to-alumina ratio (SAR) of about 5 to about 100 and having a framework type selected from the group consisting of CHA, AEI, AFX, ERI, KFI, LEV, and combinations thereof. Exemplary metals for ion exchange of such zeolites include iron and copper.

The emission treatment system can further include other catalyst components, such as one or both of a diesel oxidation catalyst and a catalyzed soot filter upstream of the SCR catalyst unit and in fluid communication with the exhaust gas stream.

In another aspect, the invention provides a method of treating an exhaust gas stream, such as exhaust gas produced by an engine, the method comprising producing an exhaust gas stream (e.g., from an engine); passing the exhaust gas stream into an emission control system that includes an SCR catalyst unit; providing an ammonia generation system adapted to provide ammonia for injection into the exhaust gas stream and comprising a reservoir containing ammonium hydroxide and an ammonia injector positioned to inject ammonia into the exhaust gas stream upstream of the SCR catalyst unit; heating ammonium hydroxide to produce gaseous ammonia; and transferring the gaseous ammonia through the ammonia injector into the exhaust gas stream such that the gaseous ammonia disperses within the exhaust gas stream upstream of the SCR catalyst unit. The gaseous ammonia is typically stored in a tank upstream of the ammonia injector.

The disclosure includes, without limitation, the following embodiments:

Embodiment 1: An emission control system for treatment of an exhaust gas stream, comprising:
an SCR catalyst unit in fluid communication with an exhaust gas stream; and an ammonia generation system adapted to provide ammonia for injection into the exhaust gas stream and comprising a reservoir containing ammonium hydroxide and an ammonia injector, wherein the reservoir is in fluid communication with the ammonia injector and the ammonia injector is in fluid communication with the exhaust gas stream upstream of the SCR catalyst unit.

Embodiment 2: The emission control system of any preceding embodiment, wherein the reservoir is a refillable reservoir having a refilling port.

Embodiment 3: The emission control system of any preceding embodiment, wherein the ammonia generation system further comprises a gaseous ammonia storage tank, a conduit connecting the gaseous ammonia storage tank and the reservoir, and a heater positioned to heat ammonia hydroxide within either the reservoir or the conduit in order to produce gaseous ammonia, wherein the gaseous ammonia storage tank is in fluid communication with the ammonia injector.

Embodiment 4: The emission control system of any preceding embodiment, further comprising one or more controllers adapted to monitor and control heating of the ammonium hydroxide to produce gaseous ammonia and to monitor and control the amount of ammonia injected into the exhaust gas stream by the ammonia injector.

Embodiment 5: The emission control system of any preceding embodiment, wherein the reservoir is in fluid communication with a windshield fluid tank such that a solution of ammonium hydroxide reduced in ammonia concentration can be purged from the reservoir.

Embodiment 6: The emission control system of any preceding embodiment, wherein the exhaust gas stream is produced by a diesel engine.

Embodiment 7: The emission control system of any preceding embodiment, wherein the SCR catalyst unit comprises an SCR catalyst comprising a metal ion-exchanged molecular sieve or a mixed oxide catalyst.

Embodiment 8: The emission control system of any preceding embodiment, wherein the SCR catalyst is a metal ion-exchanged zeolite having a silica-to-alumina ratio (SAR) of about 5 to about 100 and having a framework type selected from the group consisting of CHA, AEI, AFX, ERI, KFI, LEV, and combinations thereof.

Embodiment 9: The emission control system of any preceding embodiment, wherein the metal ion-exchanged zeolite is ion-exchanged with iron or copper.

Embodiment 10: The emission treatment system of any preceding embodiment, further comprising one or both of a diesel oxidation catalyst and a catalyzed soot filter upstream of the SCR catalyst unit and in fluid communication with the exhaust gas stream.

Embodiment 11: A method of treating an exhaust gas stream, the method comprising: receiving the exhaust gas stream into an emission control system that includes an SCR catalyst unit; and generating ammonia in an ammonia generation system adapted to provide ammonia for injection into the exhaust gas stream, said generating step comprising heating ammonium hydroxide to produce gaseous ammonia, and transferring the gaseous ammonia into the exhaust gas stream such that the gaseous ammonia disperses within the exhaust gas stream upstream of the SCR catalyst unit.

Embodiment 12: The method of any preceding embodiment, wherein the ammonia generation system comprises a reservoir containing ammonium hydroxide and an ammonia injector positioned to inject ammonia into the exhaust gas stream upstream of the SCR catalyst unit.

Embodiment 13: The method of any preceding embodiment, wherein the gaseous ammonia is stored in a tank upstream of the ammonia injector.

Embodiment 14: The method of any preceding embodiment, wherein the exhaust gas stream is produced by a diesel engine.

Embodiment 15: The method of any preceding embodiment, wherein the SCR catalyst unit comprises an SCR catalyst comprising a metal ion-exchanged molecular sieve or a mixed oxide catalyst.

Embodiment 16: The method of any preceding embodiment, wherein the SCR catalyst is a metal ion-exchanged zeolite having a silica-to-alumina ratio (SAR) of about 5 to about 100 and having a framework type selected from the group consisting of CHA, AEI, AFX, ERI, KFI, LEV, and combinations thereof.

Embodiment 17: The method of any preceding embodiment, wherein the metal ion-exchanged zeolite is ion-exchanged with iron or copper.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosure, in any of its various aspects and embodiments, should be viewed as intended to be combinable unless the context clearly dictates otherwise.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention provides a method and system that produces ammonia for use as a reductant in an SCR catalyst unit of an emission control system, particularly an emission control system used to treat exhaust from internal combustion engines. The method and system utilize a reservoir containing ammonium hydroxide, sometimes referred to as ammonia water or ammonia solution, which can be mounted (for example, on a vehicle) in proximity to other emission control system components. Ammonium hydroxide is a mixture of $NH_3$ and water, with a typical ammonia concentration being in the range of about 20% to about 40% by weight, more typically about 25% to about 35% by weight. Ammonium hydroxide is commercially available as a chemical reagent and can be formed by bubbling ammonia gas into water using techniques known in the art. The ammonium hydroxide will readily liberate gaseous ammonia upon heating, which can be directly injected into an engine exhaust stream.

Injecting ammonia into an exhaust stream from an ammonium hydroxide source has several potential advantages over use of conventional diesel exhaust fluid, which is a mixture of urea and water with a urea concentration typically in the range of about 30% to 35% by weight. For instance, direct injection of ammonia can occur at temperatures below 200° C. without the difficulties associated with urea injection at such temperatures, such as urea deposition/fouling and insufficient decomposition of urea into ammonia. In addition, diesel exhaust fluid must be pressurized to about 5 bar to ensure proper penetration into an exhaust stream, whereas ammonia injection does not require the same level of pressurization. Still further, direct injection of ammonia eliminates the need for the longer mixing channels or higher degree of turbulence associated with urea injection. Since ammonia has a vaporization point of −33° C. and there is no need to decompose urea to produce the ammonia, the systems of the invention operate more efficiently in cold environments and require less heating. It is also believed that an ammonia injection system will be more easily monitored/controlled than a diesel exhaust fluid system and will yield better $NO_x$ conversion.

Exhaust Gas Treatment System and Method

Figure 3:
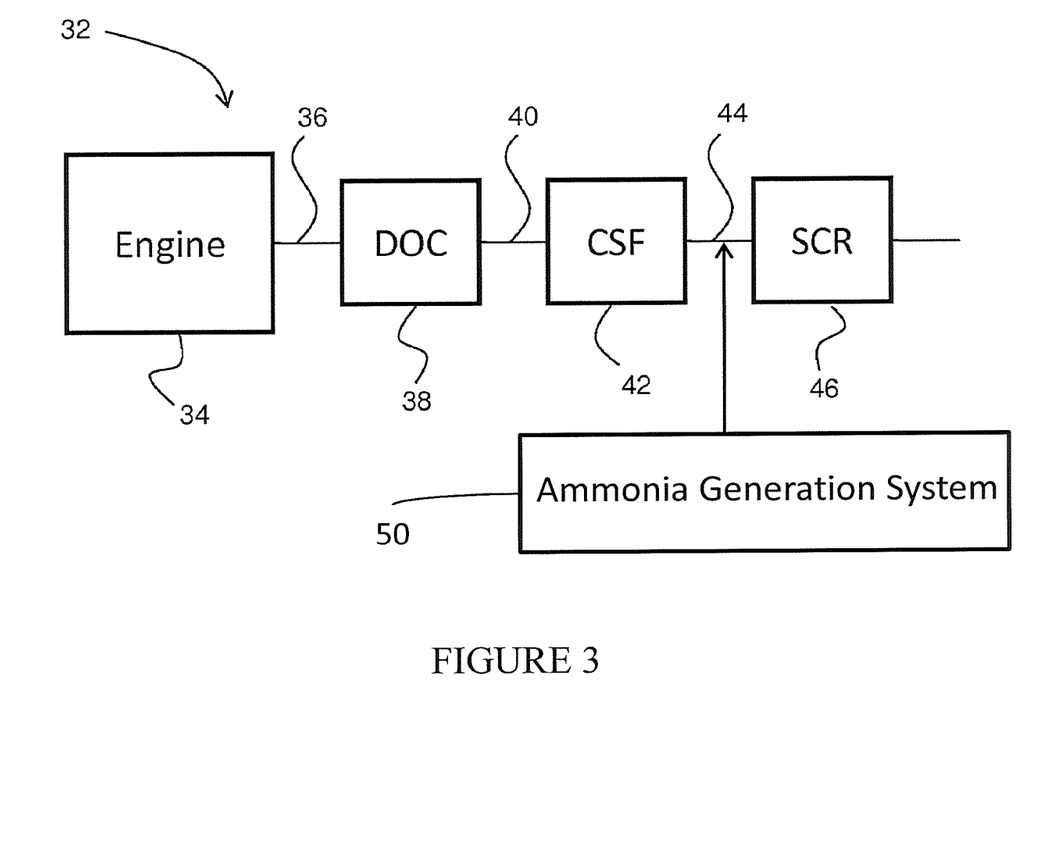
FIG. 3 shows a schematic depiction of an embodiment of an emission treatment system in which an ammonia generation system of the invention is utilized.

An aspect of the present invention is directed to an exhaust gas treatment system and method for treating an exhaust gas produced from various sources. In one or more embodiments, an exhaust gas treatment system of the invention comprises an engine or other exhaust gas source, particularly a lean burn engine such as a diesel engine or lean burn gasoline engine, an SCR catalyst unit downstream from the engine, and an ammonia generation system as described herein. One exemplary emissions treatment system is illustrated in FIG. 3, which depicts a schematic representation of an emission treatment system 32. As shown, an exhaust gas stream containing gaseous pollutants and particulate matter is conveyed via exhaust pipe 36 from an engine 34 to an optional diesel oxidation catalyst (DOC) 38.

In the optional DOC 38, unburned gaseous and non-volatile hydrocarbons and carbon monoxide are largely combusted to form carbon dioxide and water. In addition, a proportion of the NO of the NO component may be oxidized to $NO_2$ in the DOC. Oxidation catalysts comprising a precious metal, such as platinum group metals (PGMs), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited.

The exhaust stream is next conveyed via exhaust pipe 40 to an optional catalyzed soot filter (CSF) 42, which traps particulate matter present within the exhaust gas stream. The CSF 42 is optionally catalyzed for passive or active soot regeneration. The CSF 42 can optionally include an SCR catalyst composition for the conversion of NO present in the exhaust gas.

After removal of particulate matter, via CSF 42, the exhaust gas stream is conveyed via exhaust pipe 44 to a downstream SCR catalyst unit 46 for the further treatment and/or conversion of $NO_x$. Exemplary SCR catalyst units 46 are described in greater detail below. As shown, the ammonia generation system 50, explained in greater detail below, is positioned to inject ammonia into exhaust pipe 44 upstream of the SCR catalyst unit 46.

In one embodiment, the exhaust gas treatment system does not include the optional CSF component and instead the SCR catalyst unit 46 utilizes a wall-flow filter substrate such that the unit functions both as a soot filter and an SCR catalyst. In such an embodiment, the exhaust gas can exit the DOC, for example, and thereafter directly enter the SCR catalyst/filter unit 46 with no intervening treatment unit.

In use, the emission control system treats an exhaust gas stream of an engine by receiving the exhaust gas stream produced by the engine into an emission control system that includes an SCR catalyst unit, heating ammonium hydroxide to produce gaseous ammonia; and transferring the gaseous ammonia through an injector into the exhaust gas stream such that the gaseous ammonia disperses within the exhaust gas stream upstream of the SCR catalyst unit.

Ammonia Generation System

The ammonia generation system 50 of the invention utilizes ammonium hydroxide as a source of gaseous ammonia for injection into an exhaust gas stream. A schematic representation of one example of an ammonia generation system 50 of the invention is set forth in FIG. 4. As shown, the ammonia generation system 50 includes an ammonium hydroxide reservoir 70 for storage of ammonium hydroxide. This reservoir 70 will function similarly to conventional systems that utilize a diesel exhaust fluid (DEF) reservoir. In fact, it may be possible to retrofit existing emission control systems with the current invention and utilize the existing DEF reservoir for ammonium hydroxide. As shown, the reservoir 70 can be refillable (much like a DEF reservoir) and, thus, can include a refilling port 72 that allows introduction of fresh ammonium hydroxide into the reservoir. In use, the ammonia in the reservoir will be depleted, resulting in an ammonia-depleted solution that is suitable for reuse as a windshield fluid. Accordingly, the system can include an optional purge line 74 to remove the ammonia-depleted solution, such as a purge line being in fluid connection with, for example, a windshield fluid storage tank 75 located elsewhere on a vehicle.

Figure 4:
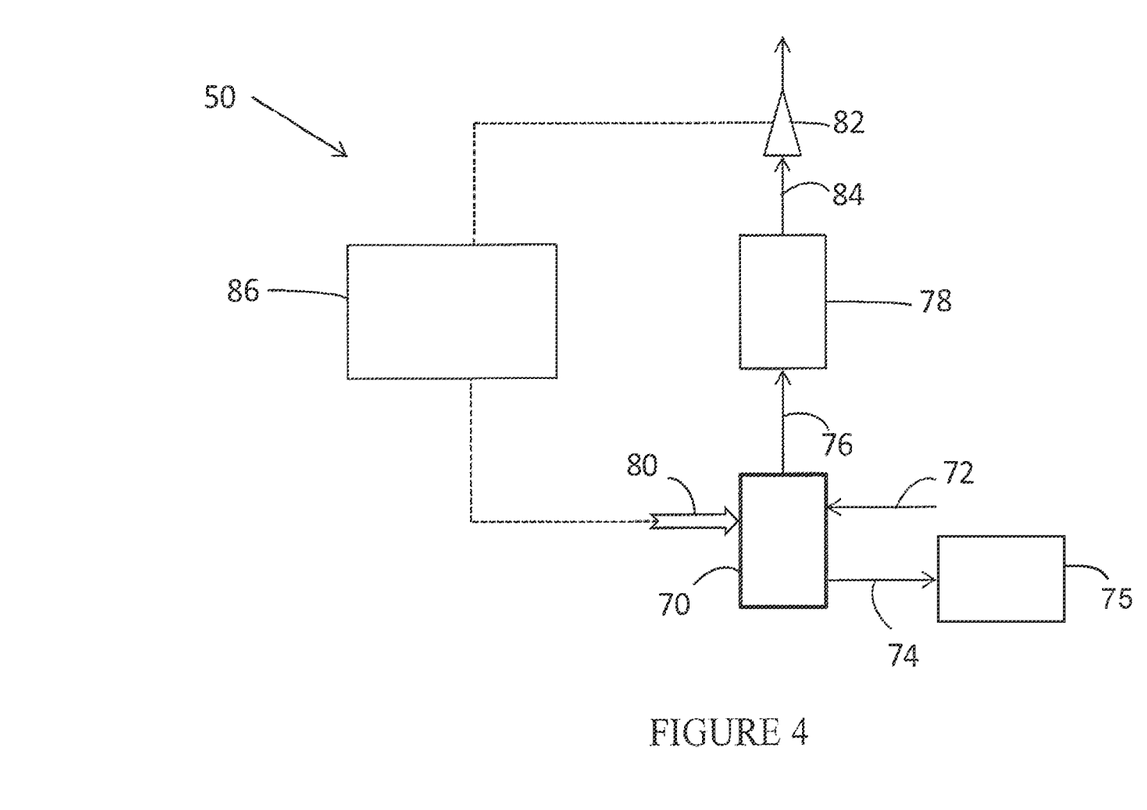
FIG. 4 shows a schematic depiction of an embodiment of an ammonia generation system of the invention.

In operation, heat energy 80 is applied to the ammonium hydroxide, either while the ammonium hydroxide solution is within the reservoir 70 or while ammonium hydroxide is within a conduit 76 in fluid communication with the reservoir. In either case, the gaseous ammonia liberated by such heating is stored in storage tank 78, which is in fluid communication with the conduit 76. Optionally, the ammonia storage tank 78 may further include a hydrophobic zeolite, such as clinoptilolite, or other suitable adsorbent material to adsorb and store the ammonia gas. From the storage tank 78, the gaseous ammonia can pass through a second conduit 84 and into an ammonia injector 82. Thereafter, the gaseous ammonia is introduced into the exhaust gas stream upstream of the SCR catalyst unit as shown in FIG. 3. The ammonia injector 82 can comprise, for example, an injection nozzle. In some cases, the same injection system used for DEF systems can be used for ammonia injection in the present invention. The ammonia injector may be configured to inject ammonia into the exhaust gas stream intermittently on-demand.

In certain embodiments, the ammonia generation system 50 can further include a check valve in the conduit 84 leading to the injector 82 to prevent backflow/backpressure into the ammonia storage tank 78, and can further include a compressor in the conduit 84 (downstream from the check valve) to increase ammonia gas pressure, if needed, prior to injection.

The manner in which heat 80 is introduced into the ammonium hydroxide to liberate gaseous ammonia is not particularly limited in the present invention. The heat can be supplied, for example, through either heat exchange with waste heat from the engine (e.g., by heat exchange with an exhaust stream or a coolant circulating within the engine block) or through electric heating elements placed in close proximity to the reservoir 70 or the conduit 76. The temperature to which the ammonium hydroxide is heated to produce ammonia can vary, with exemplary temperatures being about 30° C. to about 70° C.

The ammonia generation system 50 of the invention can be integrated with one or more controllers 86 (e.g., a microprocessor, individually or as part of a microcontroller, a printed circuit board (PCB) that includes a microprocessor and/or microcontroller, etc.) adapted to monitor and control various aspects of the ammonia generation and injection process. For example, such a controller can monitor the temperature of the ammonium hydroxide within the reservoir 70 and/or the conduit 76 and apply heat 80 as needed to produce ammonia. Such a control system may receive various data from the ammonia generation system, such as level and temperature of the reservoir 70, as well as pressure and temperature of the gaseous ammonia storage tank 78.

In addition, an exemplary controller can monitor the performance of the SCR catalyst unit 46 and use feedback from the SCR catalyst unit to determine how much ammonia to meter into the exhaust gas stream via the ammonia injector 82. Such control systems can be adapted from known control systems already in use for DEF systems. Typical systems of conventional design that can be adapted for use in the present invention monitor SCR catalyst unit inlet/outlet temperatures and/or inlet/outlet $NO_x$ concentrations in order to monitor and adjust catalyst performance.

SCR Catalyst Unit

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" or "$NO_x$" designate the oxides of nitrogen.

Catalysts employed in the SCR process ideally should be able to retain good catalytic activity over the wide range of temperature conditions of use, for example, about 200° C. to about 600° C. or higher, under hydrothermal conditions. In preferred embodiments, the SCR catalyst is a molecular sieve promoted with a catalytic metal or a mixed oxide SCR catalyst.

As used herein, the term "mixed oxide" refers to an oxide that contains cations of more than one chemical element or cations of a single element in several states of oxidation. In one or more embodiments, the mixed oxide is selected from Fe/titania (e.g., $FeO_x/TiO_2$), Fe/alumina (e.g., $FeO_x/Al_2O_3$), Mg/titania (e.g., $MgO_x/TiO_2$), Mg/alumina (e.g., $MgO_x/Al_2O_3$), Mn/alumina, Mn/titania (e.g., $MnO_x/TiO_2$) (e.g., $MnO_x/Al_2O_3$), Cu/titania (e.g., $CuO_x/TiO_2$), Ce/Zr (e.g., $CeO_x/ZrO_2$), Ti/Zr (e.g., $TiO_x/ZrO_2$), vanadia/titania (e.g., $V_2O_x/TiO_2$), and mixtures thereof. In specific embodiments, the mixed oxide comprises vanadia/titania. The vanadia/titania oxide can be activated or stabilized with tungsten (e.g., $WO_3$) to provide $V_2O_5/TiO_2/WO_3$. In one or more embodiments, the SCR catalyst composition comprises titania in which vanadia has been dispersed. The vanadia can be dispersed at concentrations ranging from 1 to 10 wt. %, including 1, 2, 3, 4, 5, 6, 7, 8, 9, 10 wt. %. In specific embodiments, the vanadia is activated or stabilized by tungsten ($WO_3$). The tungsten can be dispersed at concentrations ranging from 0.5 to 10 wt. %, including 1, 2, 3, 3, 4, 5, 6, 7, 8, 9, and 10 wt. %. All percentages are on an oxide basis. Examples of mixed oxide SCR catalysts, particularly titania/vanadia SCR catalysts, are set forth in US Publ. No. 2001/0049339 to Schafer-Sindlinger et al., which is incorporated by reference herein in its entirety.

The term "molecular sieve" refers to framework materials such as zeolites and other framework materials (e.g., isomorphously substituted materials). Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. According to one or more embodiments, it will be appreciated that by defining the molecular sieves by their framework type, it is intended to include any and all zeolite or isotypic framework materials, such as SAPO, ALPO and MeAPO, Ge-silicates, all-silica, and similar materials having the same framework type.

Generally, molecular sieves, e.g., zeolites, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 to 10 Angstroms in diameter. The molar ratio of silica-to-alumina (SAR) of zeolites, as well as other molecular sieves, can vary over a wide range, but is generally 2 or greater. In one or more embodiments, the molecular sieve has a SAR molar ratio in the range of about 2 to about 300, including about 5 to about 250; about 5 to about 200; about 5 to about 100; and about 5 to about 50. In one or more specific embodiments, the molecular sieve has a SAR molar ratio in the range of about 10 to about 200, about 10 to about 100, about 10 to about 75, about 10 to about 60, and about 10 to about 50; about 15 to about 100, about 15 to about 75, about 15 to about 60, and about 15 to about 50; about 20 to about 100, about 20 to about 75, about 20 to about 60, and about 20 to about 50.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. The term "aluminophosphates" refers to another specific example of a molecular sieve, including aluminum and phosphate atoms. Aluminophosphates are crystalline materials having rather uniform pore sizes.

In one or more embodiments, the molecular sieve, independently, comprises $SiO_4/AlO_4$ tetrahedra that are linked by common oxygen atoms to form a three-dimensional network. In other embodiments, the molecular sieve comprises $SiO_4/AlO_4/PO_4$ tetrahedra. The molecular sieve of one or more embodiments can be differentiated mainly according to the geometry of the voids which are formed by the rigid network of the $(SiO_4)/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve comprises ring sizes of no larger than 12, including 6, 8, 10, and 12.

According to one or more embodiments, the molecular sieve can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve comprises an 8-ring small pore aluminosilicate zeolite. As used herein, the term "small pore" refers to pore openings which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. In one or more embodiments, the molecular sieve is a small pore molecular sieve having a maximum ring size of eight tetrahedral atoms.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Exemplary zeolitic framework types used in certain embodiments include AEI, AFT, AFX, AFV, AVL, CHA, DDR, EAB, EEI, EMT, ERI, FAU, GME, IFY, IRN, JSR, KFI, LEV, LTA, LTL, LTN, MER, MOZ, MSO, MWF, MWW, NPT, OFF, PAU, RHO, RTE, RTH, SAS, SAT, SAV, SBS, SBT, SFW, SSF, SZR, TSC, UFI, and WEN. In certain advantageous embodiments, the zeolitic framework is selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. In other specific embodiments, the molecular sieve has a framework type selected from the group consisting of CHA, AEI, AFX, ERI, KFI, LEV, and combinations thereof. In still further specific embodiments, the molecular sieve has a framework type selected from CHA, AEI, and AFX. In one or more very specific embodiments, the molecular sieve has the CHA framework type.

Zeolitic CHA-framework type molecular sieves include a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of additional synthetic forms of zeolitic CHA framework type is described in U.S. Pat. Nos. 4,544,538 and 6,709,644, which are hereby incorporated by reference. Synthesis of a synthetic form of a molecular sieve having the CHA framework type, silicoaluminophosphate 34 (SAPO-34), is described in U.S. Pat. Nos. 4,440,871 and 7,264,789, which are hereby incorporated by reference. A method of making yet another synthetic molecular sieve having the CHA framework type, SAPO-44, is described in U.S. Pat. No. 6,162,415, which is hereby incorporated by reference.

As used herein, the term "promoted" refers to a component that is intentionally added to the molecular sieve material, typically through ion exchange, as opposed to impurities inherent in the molecular sieve. In order to promote the selective catalytic reduction of nitrogen oxides in the presence of ammonia, in one or more embodiments, a suitable metal is independently exchanged into the molecular sieve. According to one or more embodiments, the molecular sieve is promoted with copper (Cu) and/or iron (Fe), although other catalytic metals could be used without departing from the invention, such as manganese, cobalt, nickel, cerium, platinum, palladium, rhodium or combinations thereof. Typical amounts of promoter metal include about 0.5 to about 15% by weight of the SCR catalyst material.

The copper- or iron-containing molecular sieves are prepared, for example, via ion-exchange from, for example, a $Na^+$ containing molecular sieve ($Na^+$ form). The $Na^+$ form generally refers to the calcined form without any ion exchange. In this form, the molecular sieve generally contains a mixture of $Na^+$ and $H^+$ cations in the exchange sites. The fraction of sites occupied by $Na^+$ cations varies depending on the specific zeolite batch and recipe. Optionally, the alkali metal molecular sieves are $NH_4^+$-exchanged and the $NH_4^+$ form is employed for ion-exchange with copper or iron. Optionally, the $NH_4^+$-exchanged molecular sieve is calcined to the $H^+$-exchanged form, which $H^+$ form may be employed for ion-exchange with copper or iron ions.

Copper or iron is ion-exchanged into molecular sieves with alkali metal, $NH_4^+$ or $H^+$ forms with copper or iron salts such as copper acetate, copper sulfate, iron chloride, iron acetate and the like, for example as disclosed in U.S. Pat. No. 9,242,238, which is incorporated by reference herein. For instance, a $Na^+$, $NH_4^+$ or $H^+$ form of a molecular sieve is mixed with an aqueous salt solution and agitated at an elevated temperature for a suitable time. The slurry is filtered and the filter cake is washed and dried.

In one or more embodiments, the SCR catalyst is disposed on a substrate to form the SCR catalyst unit. As used herein, the term "substrate" refers to the monolithic material onto which the catalyst material is placed, typically in the form of a washcoat. A washcoat is formed by preparing a slurry containing a specified solids content (e.g., 30-90% by weight) of catalyst in a liquid, which is then coated onto a substrate and dried to provide a washcoat layer. As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. The washcoat containing the metal-promoted molecular sieve of the invention can optionally comprise a binder selected from silica, alumina, titania, zirconia, ceria, or a combination thereof. The loading of the binder is about 0.1 to 10 wt. % based on the weight of the washcoat.

Figure 1A:
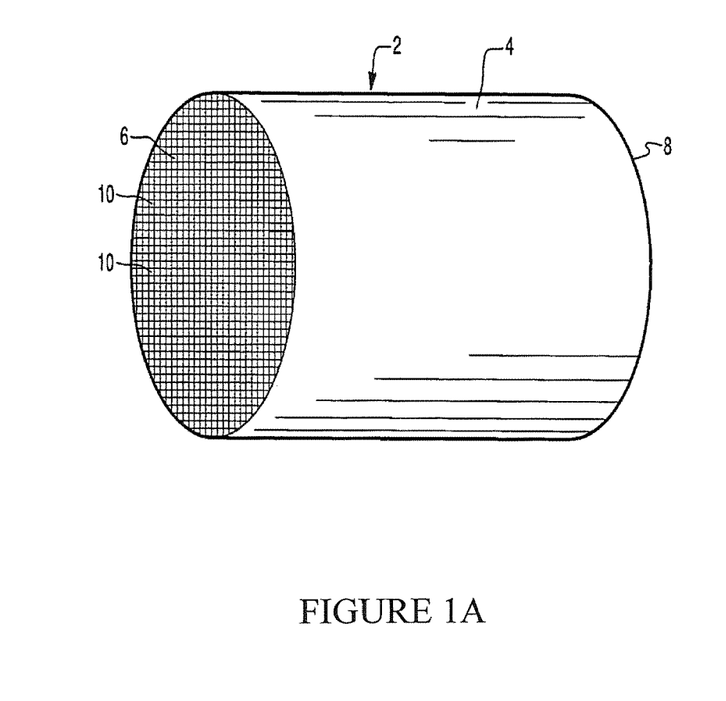
FIG. 1A is a perspective view of a honeycomb-type substrate which may comprise a catalyst composition.
Figure 1B:
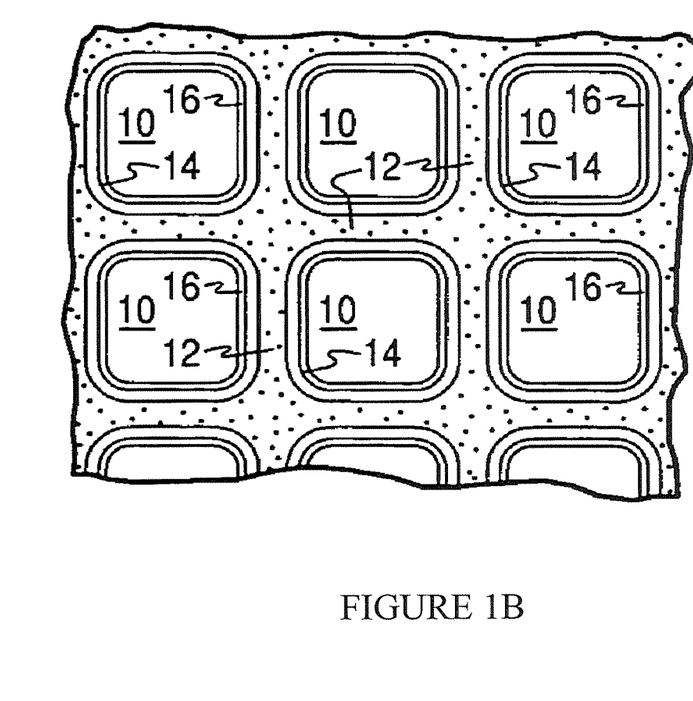
FIG. 1B is a partial cross-sectional view enlarged relative to FIG. 1A and taken along a plane parallel to the end faces of the carrier of FIG. 1A, which shows an enlarged view of a plurality of the gas flow passages shown in FIG. 1A.

In one or more embodiments, the substrate is selected from one or more of a flow-through honeycomb monolith or a particulate filter, and the catalytic material(s) are applied to the substrate as a washcoat. FIGS. 1A and 1B illustrate an exemplary substrate 2 in the form of a flow-through substrate coated with a catalyst composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the two-layer embodiment illustrated in FIG. 1B.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

A ceramic substrate may be made of any suitable refractory material, e.g., cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like. Substrates useful for the catalyst of embodiments of the present invention may also be metallic in nature and be composed of one or more metals or metal alloys. A metallic substrate may include any metallic substrate, such as those with openings or "punch-outs" in the channel walls. Metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel, in each case based on the weight of the substrate.

In one or more embodiments, the substrate is a particulate filter. As used herein, the terms "particulate filter" or "soot filter" refer to a filter designed to remove particulate matter from an exhaust gas stream such as soot. Particulate filters include, but are not limited to honeycomb wall flow filters, partial filtration filters, wire mesh filters, wound fiber filters, sintered metal filters, and foam filters.

In certain embodiments, wall flow substrates useful for supporting the SCR catalyst have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention can be catalyzed in that the wall of said element has thereon or contained therein a platinum group metal. Catalytic materials may be present on the inlet side of the substrate wall alone, the outlet side alone, both the inlet and outlet sides, or the wall itself may consist all, or in part, of the catalytic material. In another embodiment, this invention may include the use of one or more catalyst layers and combinations of one or more catalyst layers on the inlet and/or outlet walls of the substrate.

Figure 2:
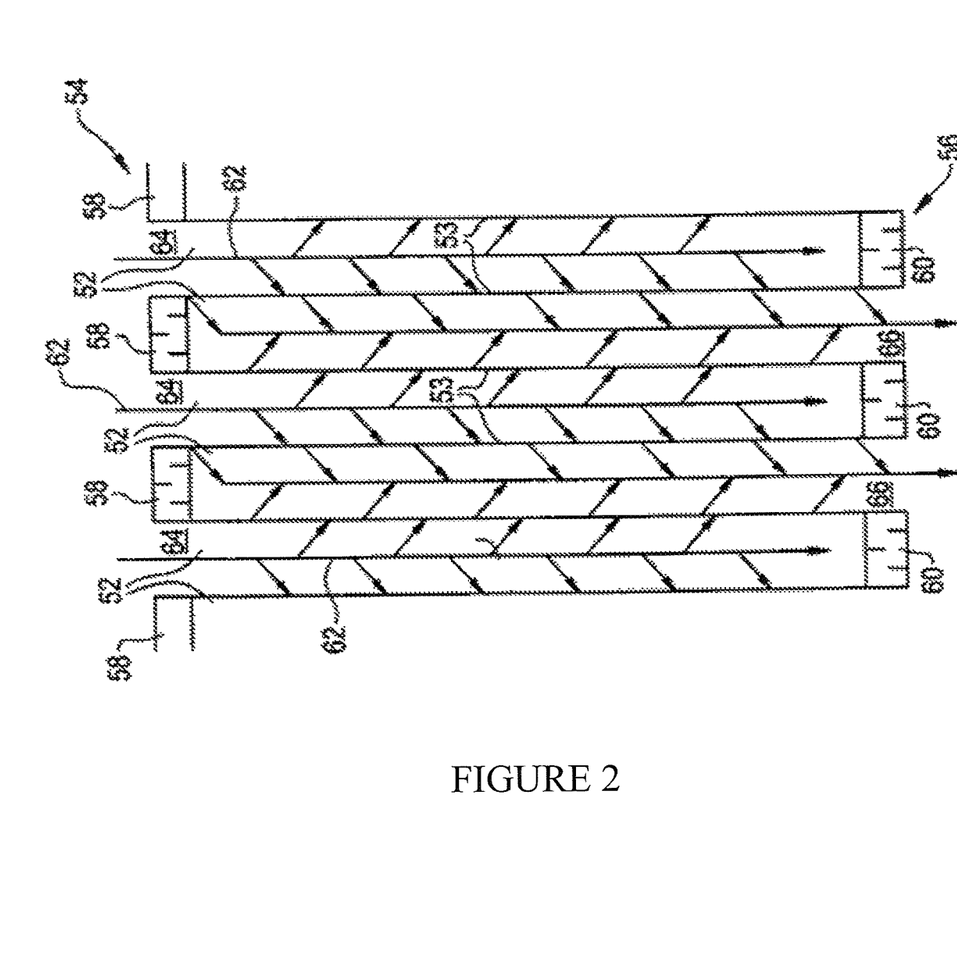
FIG. 2 shows a cross-sectional view of a section of a wall flow filter substrate.

As seen in FIG. 2, an exemplary wall flow substrate has a plurality of passages 52. The passages are enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in the invention can be catalyzed in that the wall of the substrate has thereon one or more catalytic materials.

Hydrogen Generation System

The ammonia generation system of the invention is optionally associated with a catalytic reactor configured to catalytically decompose ammonia into hydrogen and nitrogen, more fully described below. Generated hydrogen may advantageously be injected into an exhaust gas stream of an internal combustion engine where it will suitably function as a reductant in certain catalytic processes and/or catalyst regeneration processes. Catalytic processes include oxidation of CO and/or HC and/or NOx pollutants.

An exemplary on-board hydrogen generation system is configured to generate hydrogen via catalytic decomposition of ammonia and comprises a catalytic reactor configured to decompose ammonia to hydrogen and nitrogen. The catalytic reactor may comprise a hydrogen separation membrane, which membrane may comprise a catalytic coating composition comprising an ammonia decomposition catalyst disposed on an inner surface of the membrane. The membrane is configured so that ammonia contacts the inner surface containing the decomposition catalyst. Ammonia decomposition catalysts include for example precious metals on silica, for example supported ruthenium.

Hydrogen separation membranes may comprise palladium or palladium alloys and may for instance be ≤1.0 mm thick. For example, the membrane is ≤0.1 mm thick, for example the membrane is from about 0.001 mm, from about 0.01 or from about 0.1 mm thick to about 0.2, about 0.5 or about 1 mm thick. The membrane may be supported with a perforated stainless steel sheet, for instance about 1 mm thick. Alternatively, the membrane may be supported on a porous ceramic tube or rod. The membrane may be associated with a heating element, e.g., an electrical heating element, to maximize the flow of hydrogen and separation from oxygen.

The hydrogen generation system may comprise a hydrogen storage article, which for instance may be configured to store hydrogen in a gaseous, liquid or solid state. Hydrogen may, for example, be stored in a gas storage tank or reservoir. Hydrogen may be stored for instance in a solid state, for example in silicon or a hydrogen storage alloy. Solid state hydrogen storage is taught, for example, in U.S. Pub. Nos. 2004/0241507, 2008/0003470, 2008/0274873, 2010/0024542 and 2011/0236790, which are incorporated by reference herein in their entirety. Hydrogen storage alloys reversibly store hydrogen and are disclosed for example in U.S. Pat. Nos. 5,407,761 and 6,193,929 and U.S. Pub. No. 2016/0230255, which are incorporated by reference herein in their entirety. Hydrogen storage alloys are, for example, modified $AB_x$ type metal hydride (MH) alloys where in general, A is a hydride forming element and B is a weak or non-hydride forming element. A is in general a larger metallic atom with 4 or less valence electrons and B is in general a smaller metallic atom with 5 or more valence electrons. Suitable $AB_x$ alloys include those where x is from about 0.5 to about 5. The present alloys are capable of reversibly absorbing (charging) and desorbing (discharging) hydrogen. ABx type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$) and $AB_5$ ($LaNi_5$, $CeNi_5$).

The hydrogen generation system will advantageously contain a hydrogen injection article configured to inject or release hydrogen into an exhaust gas stream of an internal combustion engine. The hydrogen injection article may be configured to inject or release hydrogen intermittently on-demand. In some embodiments, the hydrogen injection article comprises a check valve.

What is claimed:

1. An emission control system for treatment of an exhaust gas stream, comprising:
    an SCR catalyst unit in fluid communication with an exhaust gas stream; and
    an ammonia generation system adapted to provide ammonia for injection into the exhaust gas stream and comprising a reservoir containing ammonium hydroxide and an ammonia injector,
    wherein the reservoir is in fluid communication with the ammonia injector and the ammonia injector is in fluid communication with the exhaust gas stream upstream of the SCR catalyst unit;
    wherein the reservoir is in fluid communication with a windshield fluid tank; and
    wherein the reservoir and the windshield fluid tank are configured to purge a solution of ammonium hydroxide reduced in ammonia concentration from the reservoir.

2. The emission control system of claim 1, wherein the reservoir is a refillable reservoir having a refilling port.

3. The emission control system of claim 1, wherein the ammonia generation system further comprises a gaseous ammonia storage tank, a conduit connecting the gaseous ammonia storage tank and the reservoir, and a heater positioned to heat ammonia hydroxide within the reservoir or the conduit in order to produce gaseous ammonia, wherein the gaseous ammonia storage tank is in fluid communication with the ammonia injector.

4. The emission control system of claim 1, further comprising one or more controllers adapted to monitor and control heating of the ammonium hydroxide to produce gaseous ammonia and to monitor and control the amount of ammonia injected into the exhaust gas stream by the ammonia injector.

5. The emission control system of claim 1, wherein the exhaust gas stream is produced by a diesel engine.

6. The emission control system of claim 1, wherein the SCR catalyst unit comprises an SCR catalyst comprising a metal ion-exchanged molecular sieve or a mixed oxide catalyst.

7. The emission control system of claim 6, wherein the SCR catalyst is a metal ion-exchanged zeolite having a silica-to-alumina ratio (SAR) of about 5 to about 100 and having a framework type, as defined by the International Zeolite Association, selected from the group consisting of CHA, AEI, AFX, ERI, KFI, LEV, and combinations thereof.

8. The emission control system of claim 7, wherein the metal ion-exchanged zeolite is ion-exchanged with iron or copper.

9. The emission control system of claim 1, further comprising one or both of a diesel oxidation catalyst and a catalyzed soot filter upstream of the SCR catalyst unit and in fluid communication with the exhaust gas stream.

10. A method of treating an exhaust gas stream, the method comprising: receiving the exhaust gas stream into an emission control system that includes an SCR catalyst unit; and
  generating ammonia in an ammonia generation system, which comprises a reservoir containing ammonium hydroxide, adapted to provide ammonia for injection into the exhaust gas stream, said generating step comprising heating the ammonium hydroxide to produce gaseous ammonia, and transferring the gaseous ammonia into the exhaust gas stream such that the gaseous ammonia disperses within the exhaust gas stream upstream of the SCR catalyst unit;
  wherein the reservoir is in fluid communication with a windshield fluid tank, and wherein the reservoir and the windshield fluid tank are configured to purge a solution of ammonium hydroxide reduced in ammonia concentration from the reservoir.

11. The method of claim 10, wherein the ammonia generation system comprises a reservoir containing ammonium hydroxide and an ammonia injector positioned to inject ammonia into the exhaust gas stream upstream of the SCR catalyst unit.

12. The method of claim 11, wherein the gaseous ammonia is stored in a tank upstream of the ammonia injector.

13. The method of claim 10, wherein the exhaust gas stream is produced by a diesel engine.

14. The method of claim 10, wherein the SCR catalyst unit comprises an SCR catalyst comprising a metal ion-exchanged molecular sieve or a mixed oxide catalyst.

15. The method of claim 14, wherein the SCR catalyst is a metal ion-exchanged zeolite having a silica-to alumina ratio (SAR) of about 5 to about 100 and having a framework type selected from the group consisting of CHA, AEI, AFX, ERI, KFI, LEV, and combinations thereof.

16. The method of claim 15, wherein the metal ion-exchanged zeolite is ion-exchanged with iron or copper.

\* \* \* \* \*